United States Patent
Owens et al.

(10) Patent No.: US 8,543,289 B2
(45) Date of Patent: Sep. 24, 2013

(54) AFTERMARKET TELEMATICS SYSTEM

(75) Inventors: Kevin W. Owens, Sterling Heights, MI (US); Russell A. Patenaude, Macomb Township, MI (US); Daniel C. McGarry, Oxford, MI (US); Matt C. Videtich, Farmington Hills, MI (US); Christopher L. Oesterling, Troy, MI (US)

(73) Assignee: Genreal Motors LLC, Detroit, MI (US)

( * ) Notice: Subject to any disclaimer, the term of this patent is extended or adjusted under 35 U.S.C. 154(b) by 389 days.

(21) Appl. No.: 12/895,066

(22) Filed: Sep. 30, 2010

(65) Prior Publication Data

US 2012/0083970 A1 Apr. 5, 2012

(51) Int. Cl.
*G06F 7/00* (2006.01)
*H04B 1/38* (2006.01)
*G06F 1/00* (2006.01)

(52) U.S. Cl.
USPC ............... 701/36; 701/1; 455/569.2; 455/68; 455/574; 455/343.2; 713/323

(58) Field of Classification Search
USPC .............. 455/99, 569.2, 68, 574, 343.2, 345; 701/1, 36, 49; 340/425.5, 426.16, 438, 531; 359/855; 381/86; 713/300, 310, 320; 307/39
See application file for complete search history.

(56) References Cited

U.S. PATENT DOCUMENTS

| | | | |
|---|---|---|---|
| 4,882,565 A | 11/1989 | Gallmeyer | |
| 5,798,688 A | 8/1998 | Schofield | |
| 6,019,475 A | 2/2000 | Lynam et al. | |
| 6,087,953 A | 7/2000 | DeLine et al. | |
| 6,172,613 B1 | 1/2001 | DeLine et al. | |
| 6,329,925 B1 | 12/2001 | Skiver et al. | |
| 6,366,213 B2 | 4/2002 | DeLine et al. | |
| 6,428,172 B1 | 8/2002 | Hutzel et al. | |
| 6,501,387 B2 | 12/2002 | Skiver et al. | |
| 6,505,100 B1 | 1/2003 | Stuempfle et al. | |
| 6,520,667 B1 | 2/2003 | Mousseau | |
| 6,549,793 B1 | 4/2003 | Baratono | |
| 6,654,669 B2 | 11/2003 | Eisenmann et al. | |
| 6,690,268 B2 | 2/2004 | Schofield et al. | |
| 6,756,912 B2 | 6/2004 | Skiver et al. | |
| 6,889,064 B2 | 5/2005 | Baratono et al. | |

(Continued)

OTHER PUBLICATIONS

USPTO, U.S. "Non-Final Office Action" mailed Nov. 14, 2012 for U.S. Appl. No. 12/851,025, filed Aug. 5, 2010.

(Continued)

*Primary Examiner* — Christine Behncke
(74) *Attorney, Agent, or Firm* — Ingrassia Fisher & Lorenz, P.C.

(57) ABSTRACT

An aftermarket telematics system for use with a vehicle having a vehicle bus is disclosed herein. The aftermarket telematics system includes, but is not limited to, an aftermarket telematics unit that is configured to be mounted to the vehicle, to communicate with the vehicle bus, and to detect when the vehicle has been turned off. The aftermarket telematics system also includes a vehicle communication interface device configured to connect to the vehicle bus, to be communicatively coupled with the aftermarket telematics unit, and to facilitate communication between the aftermarket telematics unit and the vehicle bus. The aftermarket telematics unit is further configured to send a sleep command to the vehicle communication interface device when the aftermarket telematics unit detects that the vehicle has been turned off. The vehicle communication interface device is configured to sleep in accordance with the sleep command.

17 Claims, 5 Drawing Sheets

(56) References Cited

U.S. PATENT DOCUMENTS

| | | | |
|---|---|---|---|
| 6,902,284 B2 | 6/2005 | Hutzel et al. |
| 6,906,632 B2 | 6/2005 | DeLine et al. |
| 6,993,351 B2 | 1/2006 | Fraser et al. |
| 7,012,727 B2 | 3/2006 | Hutzel et al. |
| 7,075,511 B1 | 7/2006 | Mousseau et al. |
| 7,142,810 B2 | 11/2006 | Oesterling |
| 7,171,187 B2 | 1/2007 | Haave et al. |
| 7,171,226 B2 | 1/2007 | Crocker et al. |
| 7,257,426 B1 | 8/2007 | Witkowski et al. |
| 7,293,888 B2 | 11/2007 | Hutzel et al. |
| 7,299,076 B2 | 11/2007 | Dunn, Jr. et al. |
| 7,308,341 B2 | 12/2007 | Schofield et al. |
| 7,346,374 B2 | 3/2008 | Witkowski et al. |
| 7,349,722 B2 | 3/2008 | Witkowski et al. |
| 7,372,818 B2 | 5/2008 | Fraser et al. |
| 7,395,096 B2 | 7/2008 | Baratono et al. |
| 7,474,942 B2 | 1/2009 | Patenaude |
| 7,488,080 B2 | 2/2009 | Skiver et al. |
| 7,526,367 B2 | 4/2009 | Schofield et al. |
| 7,651,228 B2 | 1/2010 | Skiver et al. |
| 7,657,052 B2 | 2/2010 | Larson et al. |
| 7,690,824 B2 | 4/2010 | Uken et al. |
| 7,711,479 B2 | 5/2010 | Taylor et al. |
| 7,734,392 B2 | 6/2010 | Schofield et al. |
| 7,904,023 B2 * | 3/2011 | Viitamaki et al. ........... 455/41.2 |
| 7,970,446 B2 | 6/2011 | Witkowski et al. |
| 8,194,133 B2 | 6/2012 | Dewind et al. |
| 2002/0197955 A1 | 12/2002 | Witkowski et al. |
| 2003/0001734 A1 | 1/2003 | Schofield et al. |
| 2003/0020603 A1 | 1/2003 | DeLine et al. |
| 2003/0102688 A1 | 6/2003 | Bingle et al. |
| 2003/0117728 A1 | 6/2003 | Hutzel et al. |
| 2003/0191583 A1 | 10/2003 | Uhlmann et al. |
| 2004/0127206 A1 | 7/2004 | Van Bosch et al. |
| 2004/0145457 A1 | 7/2004 | Schofield et al. |
| 2004/0160313 A1 | 8/2004 | McCarthy et al. |
| 2004/0165293 A1 | 8/2004 | Whitehead |
| 2004/0203379 A1 | 10/2004 | Witkowski et al. |
| 2004/0209655 A1 * | 10/2004 | Kubo ........................ 455/569.1 |
| 2005/0023858 A1 | 2/2005 | Bingle et al. |
| 2005/0032550 A1 | 2/2005 | Baratono et al. |
| 2005/0040941 A1 | 2/2005 | Schofield et al. |
| 2005/0156714 A1 | 7/2005 | McCarthy et al. |
| 2005/0156753 A1 | 7/2005 | DeLine et al. |
| 2006/0035590 A1 * | 2/2006 | Morris et al. ................ 455/41.2 |
| 2006/0220817 A1 | 10/2006 | Schofield et al. |
| 2006/0261932 A1 * | 11/2006 | Ando et al. ............. 340/426.14 |
| 2006/0290518 A1 | 12/2006 | Bingle et al. |
| 2007/0002477 A1 | 1/2007 | Whitehead |
| 2007/0058821 A1 | 3/2007 | Welsh et al. |
| 2007/0109807 A1 | 5/2007 | Lynam et al. |
| 2007/0118280 A1 | 5/2007 | Uhlmann et al. |
| 2007/0132567 A1 | 6/2007 | Schofield et al. |
| 2007/0171037 A1 | 7/2007 | Schofield et al. |
| 2008/0045274 A1 | 2/2008 | Witkowski et al. |
| 2008/0080076 A1 | 4/2008 | Hutzel et al. |
| 2008/0174414 A1 * | 7/2008 | McCarthy et al. ......... 340/425.5 |
| 2008/0186724 A1 | 8/2008 | Lynam et al. |
| 2008/0212215 A1 | 9/2008 | Schofield et al. |
| 2008/0225538 A1 | 9/2008 | Lynam et al. |
| 2008/0266389 A1 | 10/2008 | DeWind et al. |
| 2008/0300779 A1 | 12/2008 | Uhlmann et al. |
| 2009/0005136 A1 | 1/2009 | Hutzel et al. |
| 2009/0097674 A1 | 4/2009 | Watson et al. |
| 2009/0134606 A1 | 5/2009 | Schofield et al. |
| 2009/0208058 A1 | 8/2009 | Schofield et al. |
| 2009/0232328 A1 | 9/2009 | DeLine et al. |
| 2009/0284391 A1 | 11/2009 | Berkobin et al. |
| 2009/0290369 A1 | 11/2009 | Schofield et al. |
| 2009/0318084 A1 | 12/2009 | McCarthy et al. |
| 2010/0045790 A1 | 2/2010 | Lynam et al. |
| 2010/0045797 A1 | 2/2010 | Schofield et al. |
| 2010/0188508 A1 | 7/2010 | McMahon et al. |
| 2011/0227698 A1 | 9/2011 | Witkowski et al. |
| 2012/0005395 A1 * | 1/2012 | Lydon et al. .................. 710/315 |
| 2012/0236152 A1 | 9/2012 | Dewind et al. |

OTHER PUBLICATIONS

USPTO, U.S. "Non-Final Office Action" mailed Nov. 28, 2012 for U.S. Appl. No. 12/845,848, filed Jul. 29, 2010.
USPTO, U.S. "Notice of Allowance" mailed Sep. 19, 2012 for U.S. Appl. No. 12/845,822, filed Jul. 29, 2010.
Owens, K.W., et al. "Telematics Unit and Method for Controlling Telematics Unit for a Vehicle," U.S. Appl. No. 12/845,822, filed Jul. 29, 2010.
Oesterling, C.L., et al. "Aftermarket Telematics Unit for Use With a Vehicle," U.S. Appl. No. 12/845,848, filed Jul. 29, 2010.
Videtich, M.C., et al. "Vehicle Mirror and Telematics System," U.S. Appl. No. 12/851,025, filed Aug. 5, 2010.
Peariso, N.J., et al. "Aftermarket Telematics Unit and Method for Installation Verification," U.S. Appl. No. 12/899,808, filed Oct. 7, 2010.
USPTO, U.S. "Non-Final Office Action" mailed May 4, 2012 for U.S. Appl. No. 12/845,822, filed Jul. 29, 2010.
USPTO, Notice of Allowance and Fee(s) Due for U.S. Appl. No. 12/899,808, mailed Feb. 14, 2013.
USPTO, Final Office Action for U.S. Appl. No. 12/851,025, mailed Feb. 21, 2013.
German Patent & Trademark Office. German Office Action dated Nov. 20, 2012 for Application No. 10 2011 106 073.5.

* cited by examiner

AFTERMARKET TELEMATICS SYSTEM

TECHNICAL FIELD

The technical field generally relates to a telematics system, and more particularly relates to an aftermarket telematics system.

BACKGROUND

Telematics services are those services that are provided by a call center to a vehicle and/or to the operator of a vehicle via an automatic and/or on-demand communications link connecting the call center to the vehicle. Some of the more common telematics services include, but are not limited to, turn-by-turn navigation guidance, assistance during times of emergency, cellular telephone services, door unlock services, and the remote monitoring of a vehicle's maintenance requirements.

A vehicle that is capable of providing its driver with such telematics services historically has included an embedded telematics unit that is mounted to the vehicle and that is configured to communicate with both the call center and the vehicle bus. The communicative connection between the embedded telematics unit and the call center is a wireless connection and the communicative connection between the embedded telematics unit and the vehicle bus is a wired connection.

The wired connection between the embedded telematics unit and the vehicle bus enables the telematics unit to communicate and interact with any vehicle module that is also connected to the vehicle bus. As a result of this wired connection between the embedded telematics unit and the vehicle bus, the call center may also communicate and interact with any vehicle module connected to the vehicle bus. This link makes it possible to provide the driver with many of the telematics services that are offered.

Because of the popularity of telematics services, aftermarket telematics units are beginning to enter the market place. Such aftermarket telematics units make it possible for drivers of vehicles that lack an embedded telematics unit to, nevertheless, receive some or all of the available telematics services. The aftermarket telematics unit may be mounted to the vehicle and may be wired into to the vehicle's electrical system or battery to draw the power that is needed to operate the aftermarket telematics unit.

Forming a wired connection between the aftermarket telematics unit and the vehicle bus, however, has proved challenging and in many instances, impractical. One alternative has been to establish a wireless connection between the aftermarket telematics unit and the vehicle bus using a vehicle communication interface device ("VCI device"), also known as a dongle. The VCI device is configured to connect to a vehicle's assembly line diagnostic link (ALDL) which provides direct access to the vehicle bus. The VCI device is also configured to communicate wirelessly with the aftermarket telematics unit. This configuration allows the VCI device to serve as an interface between the aftermarket telematics unit and the vehicle bus.

One consideration when deploying this solution is that the ALDL is configured to provide a continuous source of power to the VCI device. This power will be supplied even when the vehicle is turned off. Therefore, it is desirable to turn the VCI device off during periods when the vehicle is turned off to avoid depleting the vehicle's battery. However, a countervailing consideration is that the call center may need to communicate with one or more vehicle components over the vehicle bus even during periods when the vehicle is turned off. Therefore, it is desirable to keep the VCI device turned on during periods when the vehicle is turned off to provide the call center with continuous access to the vehicle bus.

SUMMARY

Various examples of an aftermarket telematics system for use with a vehicle having a vehicle bus are disclosed herein.

In an example, the aftermarket telematics system includes, but is not limited to, an aftermarket telematics unit that is configured to be mounted to the vehicle, to communicate with the vehicle bus, and to detect when the vehicle has been turned off. The aftermarket telematics system further includes a vehicle communication interface device that is configured to connect to the vehicle bus, to be communicatively coupled with the aftermarket telematics unit, and to facilitate communication between the aftermarket telematics unit and the vehicle bus. The aftermarket telematics unit is further configured to send a sleep command to the vehicle communication interface device when the aftermarket telematics unit detects that the vehicle has been turned off. The vehicle communication interface device is configured to sleep in accordance with the sleep command.

In another example, the aftermarket telematics system includes, but is not limited to, an aftermarket telematics unit that is configured to be mounted to the vehicle, to communicate with the vehicle bus, and to detect when the vehicle has been turned off. The aftermarket telematics system further includes a vehicle communication interface device that is configured to connect to the vehicle bus, to be communicatively coupled with the aftermarket telematics unit, and to facilitate communication between the aftermarket telematics unit and the vehicle bus. The aftermarket telematics unit is further configured to send a sleep command to the vehicle communication interface device when the aftermarket telematics unit detects that the vehicle has been turned off. The sleep command instructs the vehicle communication interface device to sleep and to thereafter awaken periodically to detect further commands from the aftermarket telematics unit. Wherein the vehicle communication interface device is further configured to sleep and to awaken in accordance with the sleep command.

In another example, the aftermarket telematics system includes, but is not limited to, an aftermarket telematics unit that is configured to be mounted to the vehicle, to communicate with the vehicle bus, to detect when the vehicle has been turned off, to transmit and receive over a first wireless communication network, and to transmit over a second wireless communication network. A vehicle communication interface device is configured to connect to the vehicle bus, to be communicatively coupled with the aftermarket telematics unit, to transmit and receive over the first wireless communication network to facilitate communication between the aftermarket telematics unit and the vehicle bus, and to receive over the second wireless communication network. The aftermarket telematics unit is further configured to send a sleep command to the vehicle communication interface device over the first wireless communication network when the aftermarket telematics unit detects that the vehicle has been turned off and to transmit an awaken command to the vehicle communication interface device on the second wireless communication network when access to the vehicle communication interface device is needed by the aftermarket telematics unit. The vehicle communication interface device is further configured to sleep in response to the sleep command, to receive the awaken command on the second wireless communication network, and to awaken in response to the awaken command.

DESCRIPTION OF THE DRAWINGS

One or more examples will hereinafter be described in conjunction with the following drawing figures, wherein like numerals denote like elements.

DETAILED DESCRIPTION

Figure 1:
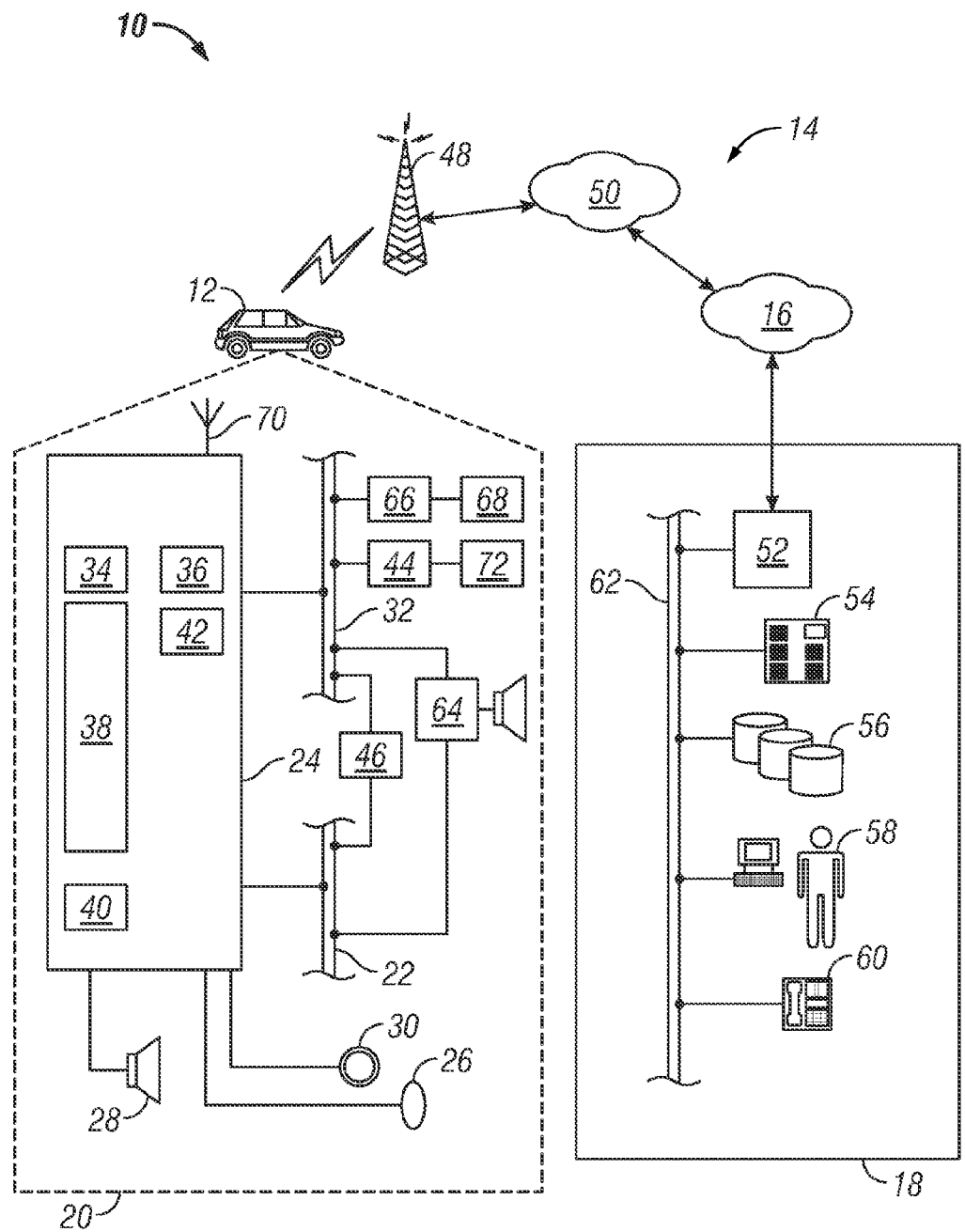
FIG. 1 is a schematic view illustrating a non-limiting example of a communication system suitable for use with examples of an aftermarket telematics system of the present disclosure.

The following detailed description is merely exemplary in nature and is not intended to limit application and uses. Furthermore, there is no intention to be bound by any expressed or implied theory presented in the preceding technical field, background, brief summary or the following detailed description.

An improved aftermarket telematics system is disclosed herein that avoids substantial depletion of the vehicle's battery and that is also capable of providing telematics services to the vehicle during periods when the vehicle is turned off. Such an aftermarket telematics system includes an improved aftermarket telematics unit and an improved VCI device. Conventional aftermarket telematics units are disclosed in a pending U.S. patent application having the Ser. No. 12/787,472 filed on May 26, 2010, and also in U.S. Publication No. 2005/0273211 published on Dec. 8, 2005, each of which is hereby incorporated herein by reference in its entirety. An example of a VCI is an ecoRoute™ HD, offered by Garmin under the part number 010-11380-00. As discussed in the above referenced patent applications, conventional aftermarket telematics units and conventional VCI devices may each include either a processor or a controller that controls their activities and that may be configured to load and execute computer programs, applications and/or software. Improvements over these conventional units and devices will be highlighted below.

Conventional aftermarket telematics units draw power from the vehicle's battery and can be configured to detect when the vehicle is turned off. One such conventional aftermarket telematics unit is disclosed in a pending U.S. patent application having the Ser. No. 12/845,822 filed on Jul. 29, 2010, and which is hereby incorporated herein by reference in its entirety. When a conventional aftermarket telematics unit determines that the vehicle has been turned off, it is configured to enter a reduced power consumption mode to reduce drain on the battery. For ease of reference herein, when a unit or device enters a reduced power consumption mode, it will be referred to as being "asleep", in "sleep mode", "sleeping", or the like. To enter sleep mode, a conventional aftermarket telematics unit shuts down some or most of its sub-systems which enables it to draw substantially less power from the vehicle's battery. In some cases, the reduction in power consumption can be up to an order of magnitude or better.

Once asleep, the conventional aftermarket telematics unit is further configured to periodically wake up. As used herein, the terms "awaken", "waking", "wake up" and the like refers to circumstances where the unit or device reactivates some or all of its sub-systems. When waking up, a conventional aftermarket telematics unit reactivates at least one of its communication systems to receive communications from the call center. Communications transmitted by the call center are synchronized with the wake/sleep cycles of the conventional aftermarket telematics units to ensure that the conventional aftermarket telematics units are available to receive such communications.

In the aftermarket telematics system of the present disclosure, the aftermarket telematics unit and the VCI device are communicatively coupled via a first communication network that is a short range wireless communication network. One such short range wireless communication network is a Bluetooth communication network. In such an arrangement, the aftermarket telematics unit and the VCI device are paired with one another and when each is awake, one will detect the other and the two will link up.

To inhibit excessive drainage of the battery, the aftermarket telematics unit of the present disclosure is configured to transmit a sleep command to the VCI device after the aftermarket telematics unit detects that the vehicle has been turned off and before entering sleep mode itself. The sleep command instructs the VCI device to go to sleep. The VCI device of the present disclosure is configured to go to sleep in response to the sleep command and to sleep in accordance with the instructions included in the sleep command. This will cause the VCI device to shut down one or more of its sub-systems which, in turn, will reduce its draw on the vehicle's battery. Such a reduction can be as great as an order of magnitude or better.

In some examples, the sleep command may instruct the VCI device to enter sleep mode and to thereafter wake up in a manner that is synchronized with the wake/sleep cycle of the aftermarket telematics unit. During such wake periods, the aftermarket telematics unit and the VCI device will link up over the first communication network. During such wake periods, the aftermarket telematics unit may access the vehicle bus via the VCI device.

In other examples, the sleep command may not include any instructions to periodically reawaken. Rather, the aftermarket telematics unit may be configured to transmit an awaken command to the VCI device instructing it to wake up whenever the aftermarket telematics unit needs access to either the vehicle's bus or the VCI device itself. In such examples, the aftermarket telematics unit and the VCI device are each configured to communicate over an additional short range wireless communication network that draws substantially less power than the first communication network.

A greater understanding of the examples of the aftermarket telematics system disclosed herein may be obtained through an examination of the illustrations accompanying this application together with a review of the detailed description that follows.

With reference to FIG. 1, there is shown a non-limiting example of a communication system 10 that may be used together with examples of the aftermarket telematics system disclosed. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the aftermarket telematics system disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

Figure 2:
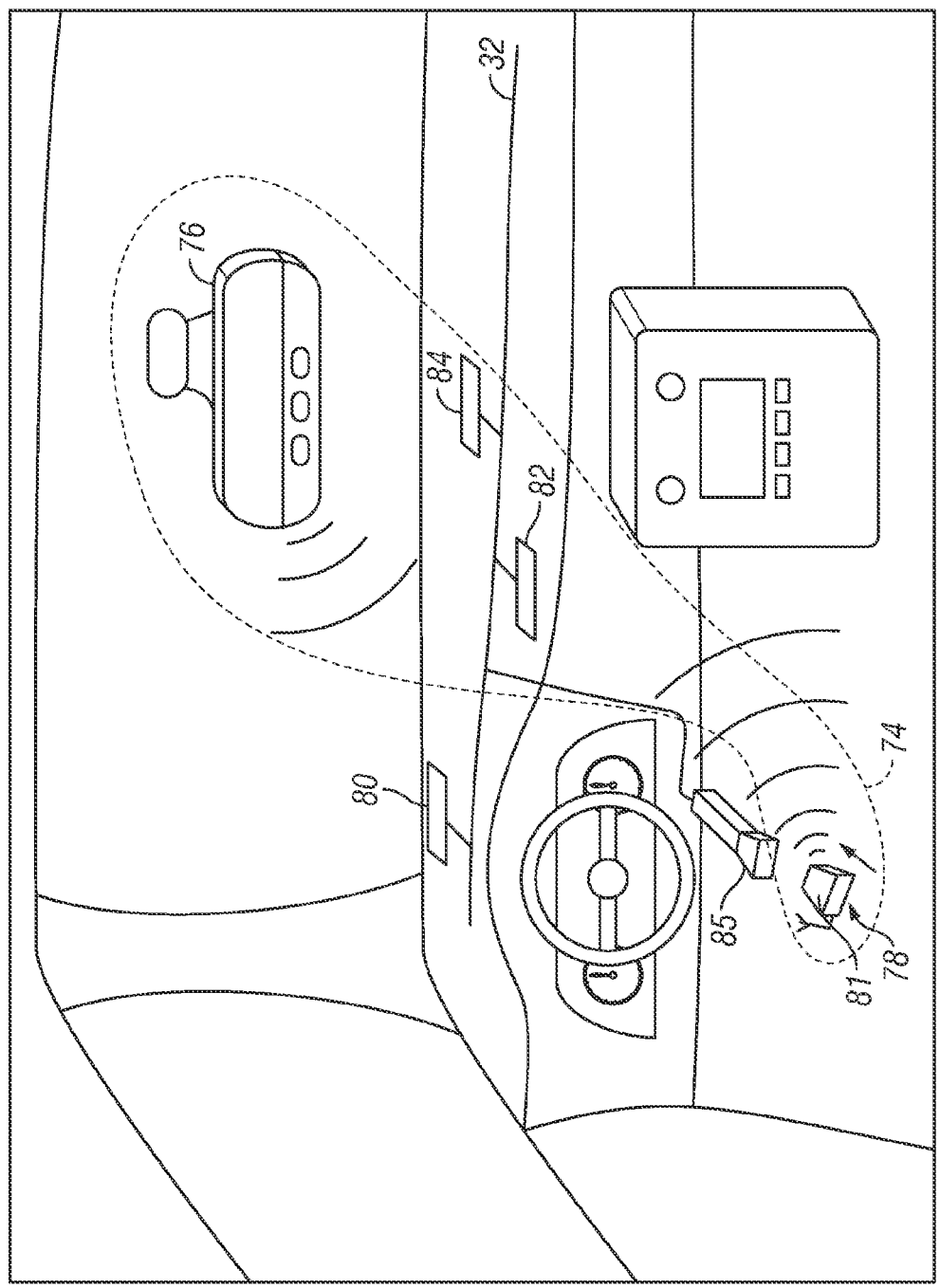
FIG. 2 is a simplified perspective view illustrating an interior of a vehicle equipped with the aftermarket telematics system of the present disclosure.

FIG. 2 is a simplified perspective view illustrating an interior of vehicle 12 equipped with the aftermarket telematics system 74 of the present disclosure. Aftermarket telematics system 74 includes an aftermarket telematics unit 76 and a VCI device 78.

In the illustrated example, aftermarket telematics unit 76 is configured as a rear view mirror but it should be understood that it may take any suitable form. Aftermarket telematics unit 76 is supplied with power by vehicle 12's battery (not shown). With continuing reference to FIGS. 1 and 2, aftermarket telematics unit 76 is configured to provide some or all of the functionality of, and to stand in for, telematics unit 24 of communication system 10, described above. As such, aftermarket telematics unit 76 is configured to communicate with various vehicle components over vehicle bus 32. To do so, aftermarket telematics unit 74 is configured to be wirelessly communicatively coupled with VCI device 78.

VCI device 78 is likewise configured to be wirelessly communicatively coupled with aftermarket telematics unit 76. VCI device 78 is further configured to communicate with vehicle bus 32. Vehicle bus 32 connects multiple vehicle components such as components 80, 82, and 84 to one another (referred to hereinafter collectively as "the vehicle components"). VCI device 78 has access to these components through its connection to vehicle bus 32. VCI device 78 is further configured to serve as an interface between aftermarket telematics unit 76 and vehicle bus 32 and thereby provide aftermarket telematics unit 76 with access to vehicle components 80, 82, and 84.

VCI device 78 has access to vehicle bus 32 via a connection to an ALDL 85. VCI device 78 includes a housing 81 that is configured to plug into or to otherwise connect to a connector associated with ALDL 85. VCI device 78 may be configured either for permanent attachment or for removable attachment to the connector. In addition to providing VCI device 78 with communicative access to the vehicle components, ALDL 85 also supplies VCI device 78 with power from the battery of vehicle 12.

Figure 3:
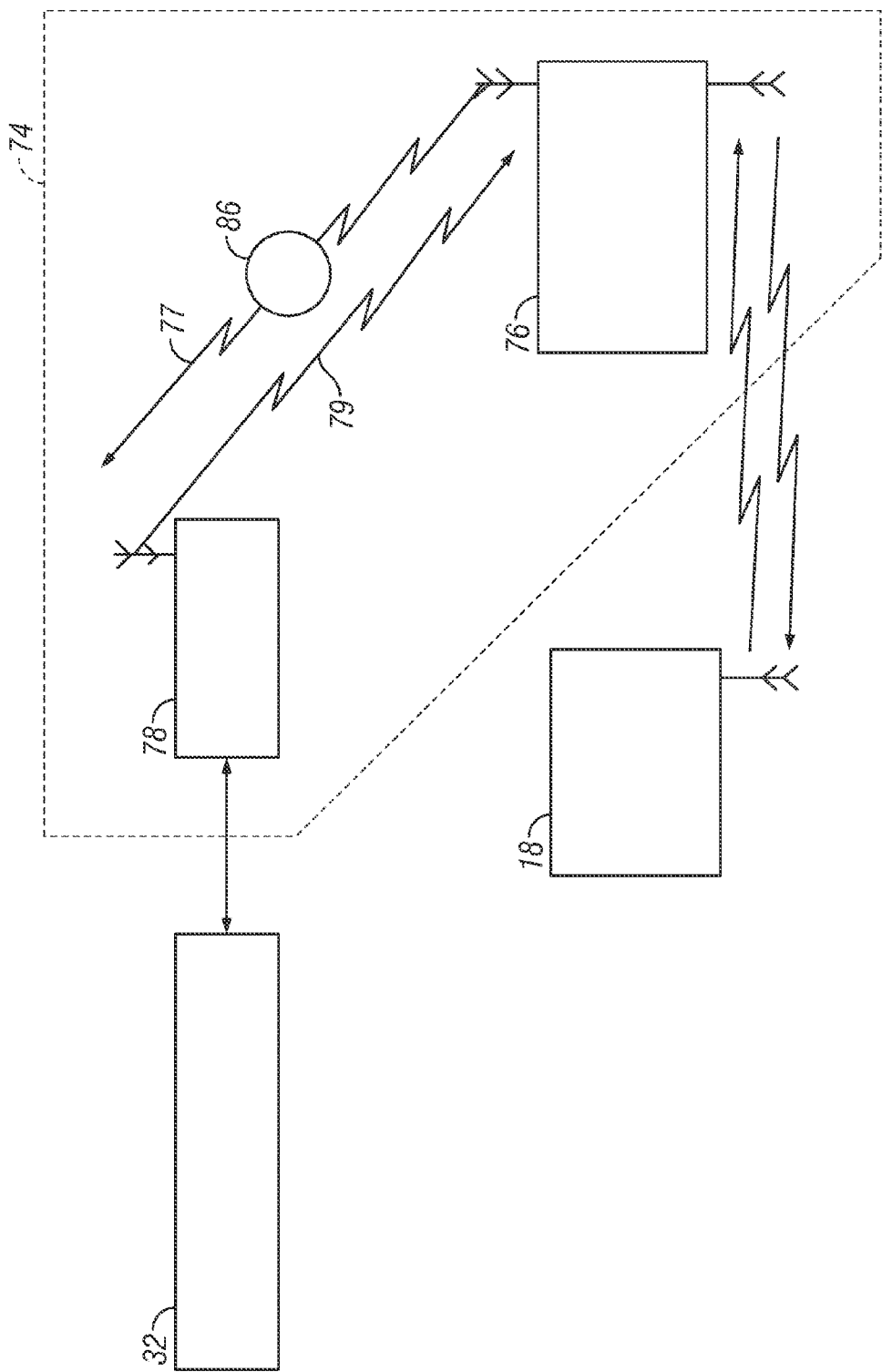
FIG. 3 is a schematic view illustrating an example of the aftermarket telematics system of the present disclosure.

FIG. 3 is a schematic view illustrating aftermarket telematics system 74. Also shown in FIG. 3 is call center 18. Call center 18 is configured to communicate with aftermarket telematics unit 76 in the same manner and for substantially the same purposes that it would communicate with telematics unit 24 of FIG. 1. Also shown in FIG. 3 is vehicle bus 32. VCI device 78 is configured to communicatively connect to vehicle bus 32 as part of its role of serving as an interface between vehicle bus 32 and aftermarket telematics unit 76.

In the illustrated example, during periods when vehicle 12 is turned on and operating, aftermarket telematics unit 76 and VCI device 78 are communicatively coupled to one another via a short range communication network, such as, but not limited to, Bluetooth™. Accordingly, aftermarket telematics unit 76 is configured to transmit signal 77 to VCI device 78 and VCI device 78 is configured to receive signal 77. Additionally, VCI device is configured to transmit signal 79 and aftermarket telematics unit 76 is configured to receive signal 79. This transmission of signals 77 and 79 back and forth between aftermarket telematics unit 76 and VCI device 78 enables aftermarket telematics unit 76 to communicate with vehicle bus 32 through VCI device 78. This, in turn, permits aftermarket telematics unit 76 to communicate with any of the vehicle components that are connected to vehicle bus 32.

From time to time, call center 18 will initiate communications with aftermarket telematics unit 76. In some instances, such communications may be for the purpose of obtaining information that resides in one or more of the vehicle components or for the purpose of providing information, such as new or revised software, to one or more of the vehicle components. These call-center-initiated communications typically occur in a manner that is not detectable by the operator of vehicle 12 and typically involve only the exchange of data between aftermarket telematics unit 76 and call center 18. The communicative coupling between aftermarket telematics unit 76 and VCI device 78 makes communication between call center 18 and the vehicle components possible.

When vehicle 12 is turned off (i.e., when the ignition is turned off and/or when bus activity ceases), aftermarket telematics unit 76 is configured to detect the change in vehicle 12's on/off status and is further configured to go to sleep to conserve power in the vehicle battery. When asleep, aftermarket telematics unit may shut down one, some or all but one of its sub-systems to reduce its power drain on the vehicle battery. The sub-systems that are not shut down may be employed to measure the passage of time and to reactivate the sub-systems of aftermarket telematics unit 76 that had been powered down after a predetermined period of time has lapsed. For example, aftermarket telematics unit 76 may be configured to sleep for a nine minute period and then to wake for a one minute period, and then to resume sleeping for a nine minute period, and so on throughout the period of time that vehicle 12 remains turned off. During the intervals when aftermarket telematics unit 76 is awake, it is able to receive communications initiated by call center 18. Call center 18 may be configured to synchronize its transmissions to vehicle 12 when vehicle 12 is turned off such that call-center-initiated transmissions are made only during intervals when aftermarket telematics unit 76 is awake.

Prior to going to sleep, but after detecting that vehicle 12 has been turned off, aftermarket telematics unit 76 is configured to transmit a sleep command 86 to VCI device 78 via signal 77. Sleep command 86 contains a set of instructions in the form of computer code that is received by VCI device 78 and that is loaded into VCI device 78's processor or controller. Sleep command 86 instructs VCI device 78 to go to sleep. VCI device 78 is configured to go to sleep in response to receiving sleep command 86, i.e., the processor or controller in VCI device 78 executes the computer code received from aftermarket telematics unit 76 and powers down one, some, or all but one of VCI device 78's sub-systems to reduce VCI device 78's drain on the vehicle battery. In this manner, excessive depletion of the vehicle battery by aftermarket telematics unit 76 and VCI device 78 can be avoided.

In the example illustrated in FIG. 3, aftermarket telematics unit 76 is configured to include additional instructions in sleep command 86 that cause VCI device 78 to sleep for a predetermined period of time, then awaken for a predetermined period of time, then sleep for a predetermined period of time, and so on. The periods of sleep and the periods of wakefulness of VCI device 78 may be coordinated with the periods of sleep and wakefulness of aftermarket telematics unit 76 such that the periods of sleep and the periods of wakefulness coincide or overlap, as desired. In some examples of aftermarket telematics system 74, during periods when aftermarket telematics unit 76 and VCI device 78 are both asleep, they are not communicatively coupled with one another. When aftermarket telematics unit 76 and VCI device 78 both awaken, the communicative coupling between them is reestablished. During these intermittent periods, communication between aftermarket telematics unit 76 and any/all of the vehicle components on vehicle bus 32 is possible. This arrangement and configuration makes it possible for aftermarket telematics unit 76 to provide information to and/or to retrieve information from any/all of the vehicle components during periods when vehicle 12 is turned off.

In some examples, VCI device 78 may be configured to fully awaken during periods of wakefulness, i.e., to reactivate each of its sub-systems. In other examples, VCI device 78 may only partially awaken during periods of wakefulness. VCI device 78 may either be configured to partially awaken during periods of wakefulness or to receive instructions from aftermarket telematics unit 76 in sleep command 86 to partially awaken during periods of wakefulness.

When VCI device 78 is partially awake, only some of its sub-systems are reactivated. For example, VCI device 78 may be configured to reactivate only those sub-systems necessary to establish the communicative coupling between aftermarket telematics unit 76 and VCI device 78 when partially awake. During such periods of partial wakefulness, if aftermarket telematics unit 76 requires access to vehicle bus 32, VCI device 78 may fully awaken to enable communication between aftermarket telematics unit 76 and vehicle bus 32. If during such periods of partial wakefulness, no call-center-initiated communications are received by aftermarket telematics unit 76, then access to the vehicle bus may not be necessary and VCI device may remain only partially awake. This permits aftermarket telematics system to further minimize the drain on the vehicle battery.

In some examples, aftermarket telematics unit 76 may be configured to detect a condition of the vehicle such as, but not limited to, the state of charge of the vehicle's battery and the length of time that vehicle 12 has been turned off. Aftermarket telematics unit 76 may be configured calculate intervals of sleep and wakefulness based in part on these conditions. For example, if the state of charge of the vehicle battery is low at the time that vehicle 12 is turned off, then aftermarket telematics unit 76 may be configured to modify its standard sleep/wake intervals to have relatively long sleep intervals, relatively short wake intervals, or both and to communicate such modified sleep/wake intervals to VCI device 78 in sleep command 86. If the state of charge of the vehicle battery is determined to be low during the period of time that the vehicle is turned off, aftermarket telematics unit 76 may be configured to alter its current sleep/wake intervals to lengthen the sleep interval, to shorten the wake interval or both, and to send a second sleep command 86 to VCI device 78 to alter its sleep/wake intervals. If aftermarket telematics unit 76 detects that vehicle 12 has been turned off for an amount of time that exceed a predetermined period (e.g., one month), then aftermarket telematics unit 76 may be configured to lengthen its sleep intervals, shorten its wake intervals, or both, and to send a second sleep command 86 to VCI device 78 to do the same.

Figure 4:
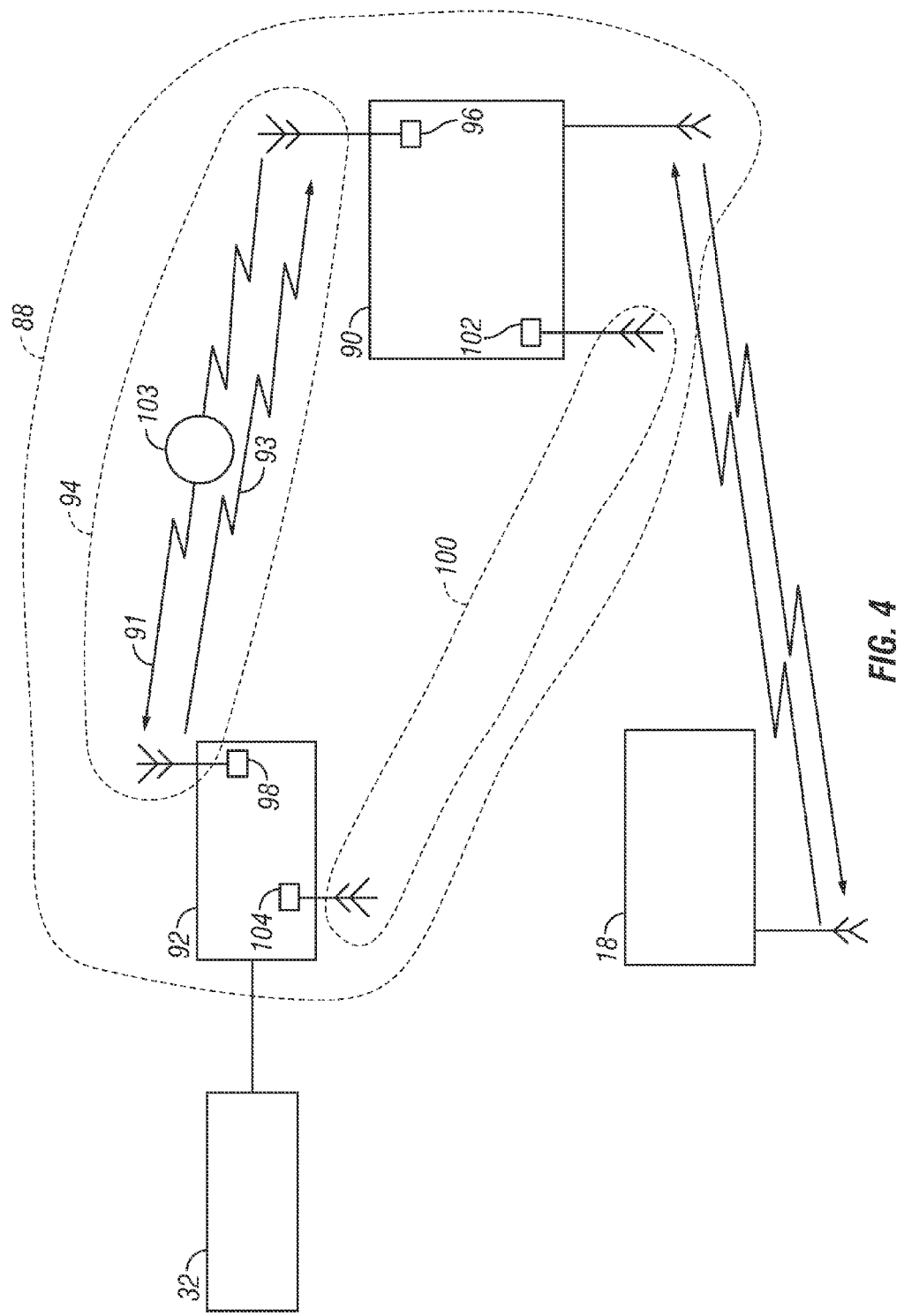
FIG. 4 is a schematic view illustrating another example of an aftermarket telematics system of the present disclosure.

FIG. 4 is a schematic view illustrating another example of an aftermarket telematics system 88 of the present disclosure. Aftermarket telematics system 88 includes an aftermarket telematics unit 90 and a VCI device 92. Aftermarket telematics unit 90 and VCI device 92 are configured to be communicatively coupled to one another via a first wireless communication network 94. In some examples, first wireless communication network 94 may be a short ranged wireless communication network such as, but not limited to, Bluetooth.

To facilitate such communicative coupling, aftermarket telematics unit 90 includes a transceiver 96 and VCI device 92 includes a transceiver 98. Aftermarket telematics unit 90 is configured to utilize transceiver 96 to transmit a signal 91 to VCI device 92 and to receive a signal 93 from VCI device 92. Conversely, VCI device 92 is configured to utilize transceiver 98 to receive signal 91 from aftermarket telematics unit 90 and to transmit signal 93 to aftermarket telematics unit 90.

Aftermarket telematics unit 90 and VCI device 92 are further configured to communicate over a second wireless communication network 100. Second wireless communication network may be a short range wireless communication network such as, but not limited to Zigbee or any other suitable low power RF network. To do so, aftermarket telematics unit includes a transmitter 102 and VCI device 92 includes a receiver 104. Receiver 104 is configured to consume substantially less power than transceiver 98 and thus communications between VCI device 92 and aftermarket telematics unit 90 over second wireless communication network 100 consumes substantially less power than communication between VCI device and aftermarket telematics unit 90 over first wireless communication network 94.

Aftermarket telematics unit 90 is configured to detect when vehicle 12 is turned off, to sleep during periods when vehicle 12 is turned off, to cycle through sleep and wake intervals when vehicle 12 is turned off, and to transmit a sleep command 103 to VCI device 92 after detecting that vehicle 12 has been turned off but before going to sleep. Sleep command 103 includes instructions in the form of computer code that are received by VCI device 92 and which are loaded into a processor or controller of VCI device 92. When VCI device 92 receives sleep command 103, VCI device 92 goes to sleep. When VCI device 92 goes to sleep, receiver 104 remains activated and VCI device 92 will remain asleep until it receives an awaken command from aftermarket telematics unit 90.

Figure 5:
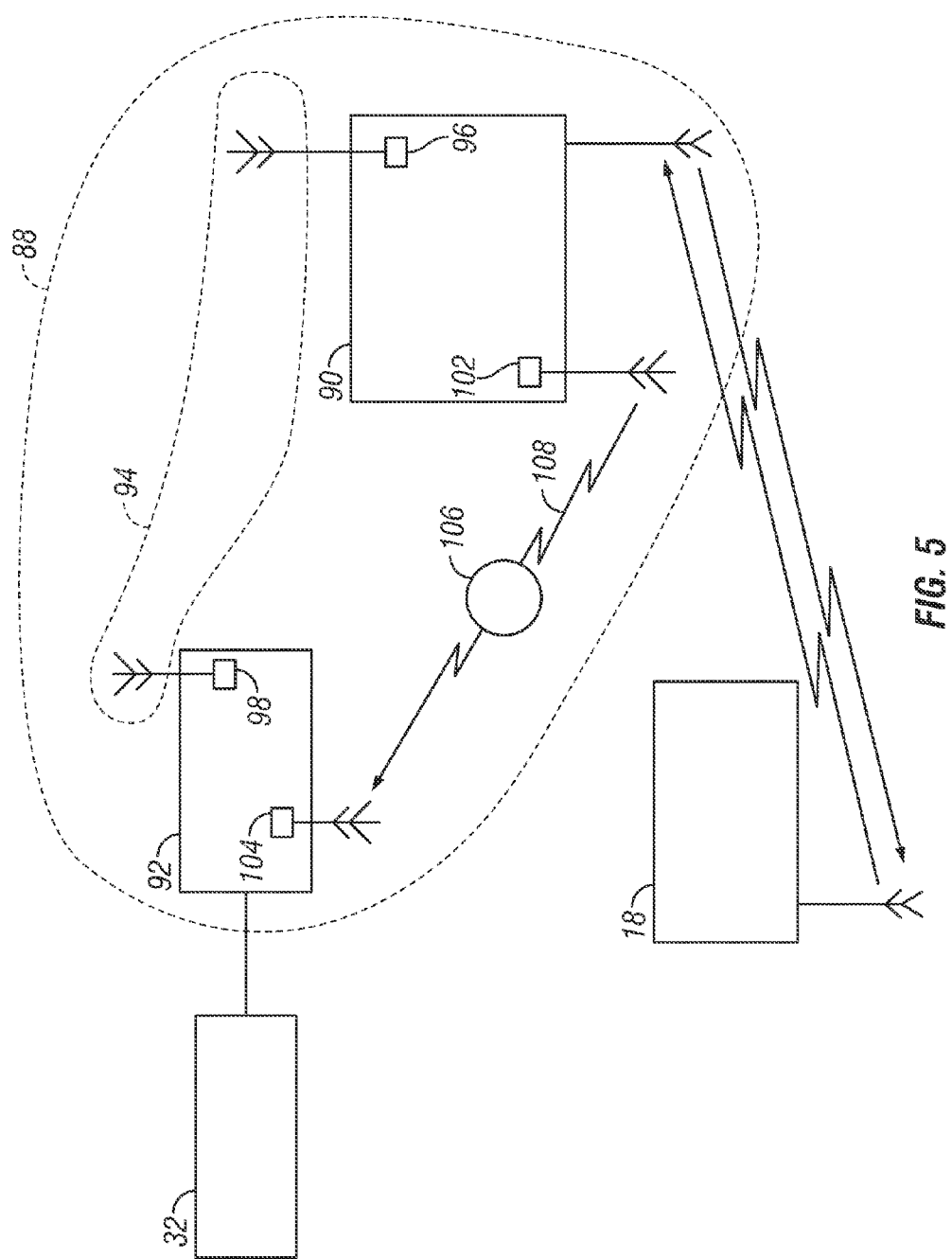
FIG. 5 is a schematic view illustrating the aftermarket telematics system of FIG. 4 when the vehicle is turned off and when the aftermarket telematics device sends an awaken command to vehicle communication interface device.

FIG. 5 is a schematic view illustrating aftermarket telematics system 88 when vehicle 12 is turned off and when aftermarket telematics unit 90 sends an awaken command 106 to VCI device 92 via a signal 108. Awaken command 106 includes instructions that, when received by VCI device 92, cause VCI device 92 to awaken. When VCI device 92 awakens, transceiver 98 is reactivated. When transceiver 98 is reactivated, aftermarket telematics unit 90 and VCI device 92 may once again be communicatively coupled to one another via first wireless communication network 94 and aftermarket telematics unit 90 may access vehicle bus 32.

While at least one example has been presented in the foregoing detailed description, it should be appreciated that a vast number of variations exist. It should also be appreciated that the examples described are not intended to limit the scope, applicability, or configuration in any way. Rather, the foregoing detailed description will provide those skilled in the art with a convenient road map for implementing the described examples. It should be understood that various changes can be made in the function and arrangement of elements without departing from the scope as set forth in the appended claims and the legal equivalents thereof.

What is claimed is:

1. An aftermarket telematics system for use with a vehicle having a vehicle bus, the aftermarket telematics system comprising:
    an aftermarket telematics unit configured to be mounted to the vehicle, to communicate with the vehicle bus, and to detect when the vehicle has been turned off; and
    a vehicle communication interface device configured to connect to the vehicle bus, to be communicatively coupled with the aftermarket telematics unit, and to facilitate communication between the aftermarket telematics unit and the vehicle bus,
    wherein the aftermarket telematics unit is further configured to send a sleep command to the vehicle communication interface device when the aftermarket telematics unit detects that the vehicle has been turned off and wherein the vehicle communication interface device is configured to sleep in accordance with the sleep command and wherein the aftermarket telematics unit is further configured to sleep after the aftermarket telematics unit detects that the vehicle has been turned off and after sending the sleep command to the vehicle communication interface device.

2. The aftermarket telematics system of claim 1, wherein the vehicle communication interface device and the aftermarket telematics unit are configured to be communicatively coupled to one another via a short range wireless communication network.

3. The aftermarket telematics system of claim 1, wherein the aftermarket telematics unit is configured to periodically awaken and wherein the vehicle communication interface device is configured to awaken when the aftermarket telematics unit periodically awakens.

4. The aftermarket telematics system of claim 3, wherein the vehicle communication interface device is configured to partially awaken when the aftermarket telematics unit periodically awakens.

5. The aftermarket telematics system of claim 3, wherein the vehicle communication interface device is configured to fully awaken when the aftermarket telematics unit periodically awakens.

6. The aftermarket telematics system of claim 3, wherein the aftermarket telematics unit is further configured to sleep and to awaken in a pattern that corresponds to a condition of the vehicle.

7. The aftermarket telematics system of claim 6, wherein the condition of the vehicle comprises a state of charge of a vehicle battery.

8. The aftermarket telematics system of claim 6, wherein the condition of the vehicle comprises a length of time that the vehicle has been turned off.

9. The aftermarket telematics system of claim 1, the vehicle bus having a connector, wherein the vehicle communication interface device includes a housing configured to be removably attached to the connector.

10. An aftermarket telematics system for use with a vehicle having a vehicle bus, the aftermarket telematics system comprising:
    an aftermarket telematics unit configured to be mounted to the vehicle, to communicate with the vehicle bus, and to detect when the vehicle has been turned off; and
    a vehicle communication interface device configured to connect to the vehicle bus, to be communicatively coupled with the aftermarket telematics unit, and to facilitate communication between the aftermarket telematics unit and the vehicle bus,
    wherein the aftermarket telematics unit is further configured to send a sleep command to the vehicle communication interface device when the aftermarket telematics unit detects that the vehicle has been turned off, wherein the sleep command instructs the vehicle communication interface device to sleep and to thereafter awaken periodically to detect further commands from the aftermarket telematics unit, and wherein the vehicle communication interface device is further configured to sleep and to awaken in accordance with the sleep command and wherein the aftermarket telematics unit is further configured to sleep after the aftermarket telematics unit detects that the vehicle has been turned off and after sending the sleep command to the vehicle communication interface device.

11. The aftermarket telematics system of claim 10, wherein the vehicle communication interface device and the aftermarket telematics unit are configured to be communicatively coupled to one another via a short range wireless communication network.

12. The aftermarket telematics system of claim 10, wherein the aftermarket telematics unit is configured to periodically awaken and wherein the vehicle communication interface device is configured to awaken when the aftermarket telematics unit periodically awakens.

13. The aftermarket telematics system of claim 12, wherein the vehicle communication interface device is configured to partially awaken when the aftermarket telematics unit periodically awakens.

14. The aftermarket telematics system of claim 12, wherein the vehicle communication interface device is configured to fully awaken when the aftermarket telematics unit periodically awakens.

15. The aftermarket telematics system of claim 12, wherein the aftermarket telematics unit is further configured to sleep and to awaken in a pattern that corresponds to a condition of the vehicle.

16. An aftermarket telematics system for use with a vehicle having a vehicle bus, the aftermarket telematics system comprising:
    an aftermarket telematics unit configured to be mounted to the vehicle, to communicate with the vehicle bus, to detect when the vehicle has been turned off, to transmit and receive over a first wireless communication network, and to transmit over a second wireless communication network; and
    a vehicle communication interface device configured to connect to the vehicle bus, to be communicatively coupled with the aftermarket telematics unit, to transmit and receive over the first wireless communication network to facilitate communication between the aftermarket telematics unit and the vehicle bus, and to receive over the second wireless communication network, wherein the aftermarket telematics unit is further configured to send a sleep command to the vehicle communication interface device over the first wireless communication network when the aftermarket telematics unit detects that the vehicle has been turned off and to transmit an awaken command to the vehicle communication interface device on the second wireless communication network when access to the vehicle communication interface device is needed by the aftermarket telematics unit, and wherein the vehicle communication interface device is further configured to sleep in response to the sleep command, to receive the awaken command on the second wireless communication network, and to awaken in response to the awaken command and wherein an amount of power consumed by the aftermarket telematics unit and the vehicle communication interface device when communicating on the second wireless communication network is substantially lower than the amount of power consumed by the aftermarket telematics unit and the vehicle communication interface device when communicating on the first wireless communication network.

17. The aftermarket telematics system of claim 16, wherein the aftermarket telematics unit is further configured to sleep after the aftermarket telematics unit detects that the vehicle has been turned off and after sending the sleep command to the vehicle communication interface device, to periodically awaken, and to transmit the awaken command as needed during periods when the aftermarket telematics unit is awake.

* * * * *